Oct. 23, 1923.
E. SCHÜRER
1,471,632
SELF INDUCTION COILS FOR LOADING TELEPHONE CABLES
Filed April 28, 1921
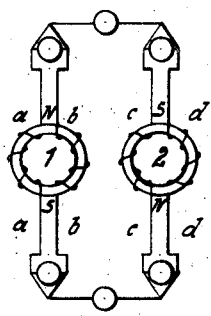
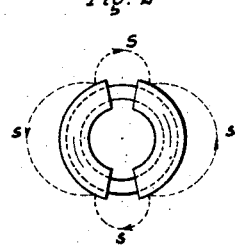
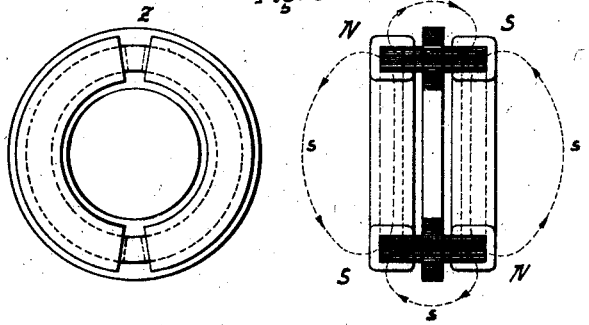
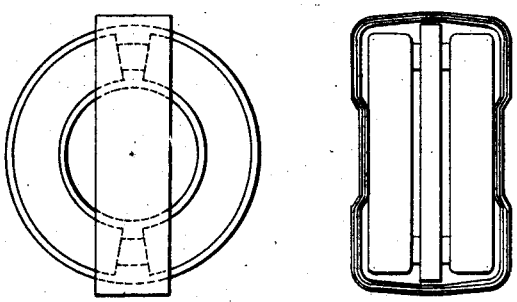
INVENTOR:
Eugen Schürer
BY Wm Wallace White
ATTY.

Patented Oct. 23, 1923.

1,471,632

UNITED STATES PATENT OFFICE.

EUGEN SCHÜRER, OF COLOGNE-MULHEIM, GERMANY.

SELF-INDUCTION COIL FOR LOADING TELEPHONE CABLES.

Application filed April 28, 1921. Serial No. 465,250.

*To all whom it may concern:*

Be it known that I, EUGEN SCHÜRER, a citizen of Germany, residing at Cologne-Mulheim, Prinz-Wilhelmstrasse Nr. 71, Germany, have invented new and useful Improvements in Self-Induction Coils for Loading Telephone Cables, of which the following is a specification.

U. S. A. Patent 1,167.654 describes an arrangement of self-induction coils for two telephone lines with phantom working, by means of which it is alleged to be possible to use one pair of coils for loading two physical lines and also the phantom circuit, for which they are used without those coils setting up any induction disturbance between adjacent conductors. The use of such coils, however, has shown that leakage fields are formed as a matter of fact, which although weak, are not weak enough in view of the great sensitiveness to induction of the circuits in question. The leakage fields which cause trouble are of two kinds, namely the internal fields existing within the pair of coils, which cause inductive disturbances between the two physical lines, or between these and the phantom line, and also the external leakage field, which passes into adjacent pairs of coils and thereby disturb adjacent lines.

This, and the relation of my invention thereto, are illustrated in the accompanying drawings, in which Fig. 1 shows such a pair of coils for loading four conductors forming two physical lines; Fig. 2, a diagram of the leakage fields arising in the loading coils of Fig. 1; and Figs. 3 and 4, the novel arrangement by which I protect the system from the evil effect of such leakage fields.

In Fig. 1, coil 1 loads the physical line $a$, $b$, coil 2 the physical line $c$, $d$. The phantom line $a$, $b$, $c$, $d$ is loaded by the common field generated in the phantom connection of the coils which, in reality, are laid one on the other. As is known, the coils are wound in such a manner that each winding, laid round the half of an annular iron core, is connected to a branch of a physical line in such a way that the iron core is magnetized without poles by the currents flowing in opposite directions in the branches of the physical line, whilst poles are formed at the points N. S. between the adjacent windings by the currents in the same direction set up in the conductors of the physical line circuit. By laying the two coils on each other in such a way that dissimilar poles are in juxtaposition, the phantom field passes from one coil to the other. It flows from pole to pole in each coil by dividing into two equal parts in the halves of the coils. Given accurate equalization of the windings, the voltages thereby induced in the halves of the physical line windings will be equal and will be of such direction as to neutralize each other as regards the physical lines, so that the latter remain uninfluenced by the phantom field. For the phantom field by far the greater portion of the magnetic resistance lies in the points of transition from one coil to the other. In order to give the phantom field the necessary strength, these transition points are bridged over by suitably dimensioned iron bridging pieces, in known manner (German Patent 288342.)

To enable these bridging pieces to be attached, the iron cores should not be covered by windings at the points where the bridge pieces are to be fixed, and therefore the coil halves must be shortened.

This is one of the reasons why the above-mentioned internal fields cause disturbance. As the winding halves can no longer be wound adjacent to each other, the coils on the cores can no longer be continuous but the windings form two separate solenoids having semi-circular axes. While these solenoids still magnetize the iron core in a poleless manner they themselves, however, form poles—even though these be only weak—which emit leakage lines of magnetic force into the atmosphere all round the winding, those in one plane being indicated by the lines $s$ in Figure 2. When two such coils, having bridging pieces, are in close proximity these leakage lines penetrate the winding halves of the adjacent coils and induce therein electromotive forces in the same direction in the physical line and thereby cause cross talk between the two physical lines.

Another cause of internal fields of disturbance will now be considered. If the magnetic resistance of the two core halves of a coil is exactly equal, and the magnetomotive force generated by the halves of the winding is likewise equal, then no magnetic fluid passes through the bridge into the other coil when the coil is traversed by current from the physical line. In practice, however, perfect equality is unattainable. This is mainly due to the impossibility of equalizing the windings to the extent of a fraction of a turn, and also because the currents in the two branches of the primary line are not of equal strength, due to a small difference in capacity of the individual conductors. As a matter of fact, the one physical line consequently sends a leakage field through the bridging piece into the coil of the other physical line. This leakage field distributes itself over the halves of this coil according to the magnetic resistances of its core halves and induces in their windings electromotive forces, which have the same direction in both branches of the physical circuit of this coil. Since they are approximately equal to one another, their action on the physical line is approximately neutralized, but generates a current in the phantom line. Hence the bridging pieces cause the physical circuit to set up cross talk in the phantom circuit.

These leakage fields cannot be rendered harmless by producing eddy currents in the iron or other metallic protective casings, because disturbing fields are also generated by the working currents and consequently the effective resistance of the coils would be increased by the eddy currents. In the case of the second leakage field above referred to such a method of screening without impairing the phantom field would be hardly possible. It is also impossible to prevent the formation of the disturbing fields. The procedure adopted according to the invention is to divert the disturbing fields without causing eddy current, and without impairing the useful fields, in such a manner that they will not enter the coil to be protected or will enter such coil only to an infinitesimal extent.

According to the invention this is effected by the novel arrangement hereafter described, and illustrated in Figure 3. The two coils are located relatively to each other in the manner already described. They are, however, no longer directly connected by the bridging pieces, but are arranged on either side of a laminated iron disc Z with which they are placed in magnetic connection by means of bridging pieces.

This arrangement leaves the useful fields unchanged. So far as the physical lines are concerned, this is self evident. In the phantom circuit, the coils at the bridging points are of equal strength, but have poles of dissimilar sign opposite each other. Consequently, one coil would generate in the disc a field which flowing in two parts through the halves of the disc from one bridging piece to the other, would be equal, but in the opposite direction, to that of the other coil. As a matter of fact, therefore, no such field is produced. The disc is only traversed at the bridging pieces by the phantom field, without however forming a magnetic shunt to the field. Thus the phantom field flows exclusively through the two coils. This is important because the similarity of the duplex field for the two coils is the guarantee that the self-induction loading in the phantom branches will remain the same even if the cores of the two coils are of different age.

Thus, while the disc does not produce any change in the working fields, the conditions are different as regards the leakage fields. The path hitherto traversed by the leakage lines entering the air at the poles of the winding cannot reach the windings of the other coil, because they are now intercepted by the disc Z, which offers a path of far lower magnetic resistance than the air. The drop in magnetic potential of the leakage field is so small in this disc, that only an infinitesimal portion of the field leaves it to enter the other coil. Likewise, the other internal field of disturbance, which previously passed through the bridging pieces from one coil to the other, now pass through the halves of the disc, which form a compensating path of far lower magnetic resistance than that through the coil located behind the disc and having the pair of bridging pieces with four points of contact which form the major portion of the resistance. With this compensation through the disc, the leakage field—in contrast to the phantom field—is not impaired by an opposing action of the other coil, since it is excited solely by the disturbing coil.

In order that the above described protective effect can be produced, the disc must project above and below the diameter of the coil, both outside and inside, to a degree sufficient to intercept that portion of the atmospheric leakage field which previously flowed between the two coils; and it must also be thick enough to afford a sufficiently low magnetic resistance. Figure 3 represents coils made according to this invention having the correct relative dimensions, which are suitable, for example, for a pair of coils for loading the physical lines with 0.16 henry and the phantom line with 0.05 henry. The disc in this case is made of the same material as the core of the coils.

In order that the fields of disturbance diverted by the disc may be practically without eddy current, the disc must be laminated to such an extent that the effective resistance of the coils in both circuits is not appreciably increased by the presence of the disc.

According to the invention the lamination is effected in a manner particularly suitable for the building up of the coils by forming the disc of a coil from thin iron strip, with the aid of an adhesive varnish. This is shown in section in Figure 3, the outer and inner ends of the strip being attached to the disc by soldering or riveting. Of course other methods of lamination could be employed, such as coils of thin wire.

The second kind of leakage fields mentioned above in describing the known method of arranging the coils, are the external fields of disturbance. They are set up by the magnetic poles formed by the phantom circuit. The two coils are laid on each other so that their unlike poles face one another, and are connected at the poles by iron bridging pieces, so that the mutual absorption of the two coil fields may cause the resulting phantom field to lie entirely within the closed iron path thereby formed. As a matter of fact, however, it has been found by experiment that leakage lines still pass into the air and set up induction disturbances in other pairs of coils located at some distance in the same box. The path of these leakage fields is indicated in Figure 3 by the lines $s$. They are for the most part concentrated symmetrically in a plane, which is represented by Figure 3 and through the longitudinal axis of the bridging pieces of the coil and in the vicinity of said plane.

Since these leakage fields, too, are generated by the working current, their elimination is governed by the same considerations as that of the internal fields. They, too, must be diverted, without causing eddy currents and without appreciably affecting the phantom field, in such a manner that they do not enter adjacent pairs of coils appreciably if at all.

According to the invention this is effected by means of the new arrangement shown in Figure 4. It comprises a frame of low magnetic resistance made of laminated iron, which surrounds the pair of coils in the direction of, and symmetrical to, the plane of the leakage field, so as to leave an air gap, and is of such height as to cover the poles of the coils. Since the frame replaces the previous paths of the leakage fields that lie outside its perimeter by paths having a far lower magnetic resistance, it absorbs these portions of the leakage fields and equalizes them in the last named paths with such a small drop in magnetic potential that only an infinitesimal number of leakage lines branch off outwardly. For this purpose it must, as already mentioned, extend beyond the poles of the coils for a sufficient breadth and must be thick enough to have a sufficiently low magnetic resistance. On the other hand, the flux of the leakage fields must not be unduly increased by the reduction of the magnetic resistance of portions of the leakage field path, primarily because of the required small magnetic fall of potential in the frame and also because the leakage fields—even when eliminated outside the frame—are still harmful, since they constitute portions of the phantom field that do not traverse both coils in common. These undesired portions of the phantom field would be increased by increased flux of the leakage field. Consequently, the frame must not unduly reduce the total magnetic resistance of the paths of the leakage fields. This is attained by the air gaps situated inside the frame and located in the path of the stray fields between the frame and the poles of the coils. On this account, the frame must not fit tight against the poles, but must surround them in such a way as to leave a sufficiently large air gap. Suitable relative dimensions for this purpose are indicated, for example, in Figure 4, which shows a frame made according to this invention for the pair of coils represented in Figure 3. The frame must be laminated to such an extent that the effective resistance of the pair of coils in the phantom circuit is not appreciably increased. A suitable method of making the frame in accordance with the invention is to wind the frame of thin iron wire, with the aid of an adhesive varnish and then, while still soft, to press it into the shape shown in Figure 4.

As has been stated with reference to Figure 3, the function of the disc is to absorb and divert from the other coil both the aerial leakage lines emanating from the coil windings and also the leakage field emanating from the bridge pieces owing to slight asymmetry of the coils.

With reference to this latter leakage field, it has also been ascertained that, in the event of large asymmetry of the coils—such as it liable to occur in mass production—said field may attain such a strength in the disc as to set up in turn induction disturbances in the coil to be protected.

The existence and disappearance of the disturbance can be ascertained in a simple manner by passing alternating current through one of the two coils in the physical circuit and at the same time measuring the induced voltage in the other (disturbed) coil, for example by means of a telephone or a compensating circuit. If there is no disturbance in the pair of coils this voltage should be zero. By the repeated application of the described method by which the two coils are alternately generating and receiving the induction and by subsequent suitable correction, the pair of coils can be entirely freed from induction disturbances.

What I claim and desire to protect by Letters Patent is:—

1. The combination with a four-wire telephone cable, of a self-induction coil couple for loading said cable, comprising an annular disk, a pair of coils disposed one at each side of said disk, one coil having its poles in juxtaposition respectively to the poles of opposite sign of the other coil, and bridge pieces magnetically connecting the cores of the coils at the poles with said disk.

2. The combination with a four-wire telephone cable, of a self-induction coil couple for loading said cable, comprising an annular disk of laminated iron, a pair of coils disposed one at each side of said disk, one coil having its poles in juxtaposition respectively to the poles of opposite sign of the other coil, and bridge pieces of laminated iron magnetically connecting the cores of the coils at the poles with said disk.

3. The combination with a four-wire telephone cable, of a self-induction coil couple for loading said cable, comprising a strip of metal wound into the form of a disk, a pair of coils disposed one at each side of said disk, one coil having its poles in juxtaposition respectively to the poles of opposite sign of the other coil, and bridge pieces magnetically connecting the cores of the coils at the poles with said disk.

4. The combination with a four-wire telephone cable, of a self-induction coil couple for loading said cable, comprising an annular disk, a pair of coils disposed one at each side of said disk, one coil having its poles in juxtaposition respectively to the poles of opposite sign of the other coil, bridge pieces magnetically connecting the cores of the coils at the poles with said disk, and a frame extending over the poles of the coils and spaced therefrom, said frame extending in the direction of and symmetrical with the plane of the leakage field.

5. The combination with a four-wire telephone cable, of a self-induction coil couple for loading said cable, comprising an annular disk, a pair of coils disposed one at each side of said disk, one coil having its poles in juxtaposition respectively to the poles of opposite sign of the other coil, bridge pieces magnetically connecting the cores of the coils at the poles with said disk, and a frame of laminated iron extending over the poles of the coils and spaced therefrom, said frame extending in the direction of and symmetrical with the plane of the leakage field.

6. The combination with a four-wire telephone cable, of a self-induction coil couple for loading said cable, comprising an annular disk of laminated iron, a pair of coils disposed one at each side of said disk, one coil having its poles in juxtaposition respectively to the poles of opposite sign of the other coil, laminated iron bridge pieces magnetically connecting the cores of the coils at the poles with said disk, and a frame of laminated iron extending over the poles of the coils in the direction of and symmetrical with the plane of the leakage field, said frame being spaced from the coils.

In testimony whereof I have signed my name to this specification.

EUGEN SCHÜRER.